United States Patent [19]
Wilson

[11] Patent Number: 5,501,383
[45] Date of Patent: Mar. 26, 1996

[54] COUPON HOLDER AND DISPENSING APPARATUS

[76] Inventor: Paul A. Wilson, 12234 Betsworth Rd., Valley Center, Calif. 92082

[21] Appl. No.: 167,575

[22] Filed: Dec. 14, 1993

[51] Int. Cl.⁶ ........................................ B62B 5/00
[52] U.S. Cl. .................. 224/411; 224/277; 224/282; 224/560; 224/564; 224/567; 224/571; 224/553; 206/425; 280/33.992; 280/DIG. 4; 40/308; 40/377
[58] Field of Search ........................ 224/273, 277, 224/282, 42.42, 42.43, 42.46 R, 42.11, 411, 553, 560, 564, 567, 571; 206/232, 425; 280/33.992, DIG. 4; 40/308, 377–379

[56] References Cited

U.S. PATENT DOCUMENTS

| | | | |
|---|---|---|---|
| 1,843,111 | 2/1932 | Dawson | 40/379 |
| 2,731,017 | 1/1956 | Neilsen | 40/378 |
| 3,351,380 | 11/1967 | Sprague | 224/273 X |
| 4,021,953 | 5/1977 | Couch | 40/308 |
| 4,156,318 | 5/1979 | Economy | 40/308 |
| 4,274,567 | 6/1981 | Sawyer | 224/42.43 |
| 4,450,994 | 5/1984 | Holland | 224/277 |
| 4,496,058 | 1/1985 | Harris et al. | 40/308 |
| 4,643,280 | 2/1987 | Hensley | 224/273 X |
| 4,643,452 | 2/1987 | Chang | 283/62 |
| 4,702,402 | 10/1987 | Ferri | 224/27 |
| 4,713,901 | 12/1987 | Wells et al. | 40/360 |
| 4,901,901 | 2/1990 | Reitenour | 224/277 |
| 4,905,392 | 3/1990 | Klein | 40/638 |
| 4,966,318 | 10/1990 | Dutka | 224/42.46 R |
| 5,002,215 | 3/1991 | Gregoire | 224/277 |
| 5,176,392 | 1/1993 | Graebe, Jr. | 280/33.992 |
| 5,197,600 | 3/1993 | Garcia | 40/379 X |
| 5,263,578 | 11/1993 | Narvey | 206/232 |

FOREIGN PATENT DOCUMENTS

| | | | |
|---|---|---|---|
| 2638681 | 5/1990 | France | 224/277 |

*Primary Examiner*—J. Casimer Jacyna
*Attorney, Agent, or Firm*—Baker, Maxham, Jester & Meador

[57] ABSTRACT

A store coupon organizing and dispensing apparatus. The apparatus has a coupon holder disposed in an elongated frame with a lower notch adapted to engage a handle of a shopping cart. The lower notch is adapted also to serve as a carrying handle. The coupon holder has a rotary mechanism which includes a drum with rods disposed on it. The rods are adapted to hold the coupon file cards, such that when the drum is rotated the coupons are serially revealed for selection by a user. Alternatively, the coupon file cards may be pivoted about an arcuate hub which is housed in a similar elongated frame. A calculator is preferably mounted on an external top face of the frame to allow a user to tally and compare prices of items. An internal enclosed storage cavity is included in the frame for storing coupons selected for use by the shopper.

27 Claims, 3 Drawing Sheets

COUPON HOLDER AND DISPENSING APPARATUS

BACKGROUND OF THE INVENTION

1. Field of the Invention

This invention is directed generally toward a shopper's organizer and more particularly pertains to an apparatus for containing, organizing, and displaying store coupons for selection purposes.

2. Description of the Related Art

Producers of various products sold in supermarkets and drug stores offer discount coupons to consumers as an incentive to buy their products. Coupons may reach the consumer through various means. Such means may include newspaper advertisements, direct mail, and dispensers attached to store shelves. Since the coupons offer considerable savings, shoppers typically want to use several coupons in a single shopping trip. In order to do this, the shopper needs some way to organize and store the coupons in a manner which makes them easily available during the shopping process.

Coupons are generally redeemable only for a particular item specified on the coupon. Because of this, the shopper must present the coupon at the point of purchase. In some modern supermarkets and pharmacies, universal price code labels on store goods and on coupons are scanned to ensure that the particular item and coupon match. If the specified item was not purchased then no discount is credited. Thus, it is important that the shopper be cognizant of which coupons are available for shopping. Preferably, the shopper would have a system for easily flipping through the coupons on hand in order to plan the shopping trip and to later match the coupon to a selected purchase. A system for easily flipping through coupons in an organized manner would also aid the shopper in the task of sorting through and presenting the correct coupon to the check-out clerk.

Coupons vary in size; however, a typical coupon measures approximately five and one-half inches by two and one-half inches. While a small number of coupons may fit into a pocket or purse type wallet, once the number of coupons reaches fifteen or more such an arrangement tends to become inconvenient and cumbersome. This is due to the difficulty of keeping the coupons organized and retrievable in such an arrangement. Since the coupons are not easily visible in a wallet of that type, it is difficult for the shopper to stay aware of which coupons are available. Further, constantly folding the coupons in a billfold type wallet tends to damage them and may render them unacceptable for redemption.

The use of organizers of various types is known in the prior art. Coupon wallet pouches designed specifically for the task of carrying coupons are available with pre-organized sections (e.g. dairy, cereal, produce, etc.). There are drawbacks to such wallet pouches. For example, the organization compartments are often fixed in place so they are not easily changed to a system which may better suit the needs of the shopper (e.g., following the floor layout of a particular store or alphabetizing by category or brand name). Also, the shopper's risk of mentally losing track of a particular coupon is increased because many coupons are accumulated together in one compartment. Unfortunately, there is also a risk that the shopper may lose the entire coupon wallet pouch or forget to bring it on the shopping trip because the pouch is small. A disadvantage of the pouch is that it must be held in the shopper's hands in order to retrieve the coupons. The typical shopper would have to frequently manipulate the pouch, which could present problems when there may also be the need to contend with a shopping list, a hand-held calculator, and perhaps young children or even infants.

A system which attaches to a shopping cart has certain advantages over the coupon wallet pouch since it frees the shopper's hands and is unlikely to be lost while shopping. Various apparatuses for organizing coupons which attach to shopping carts are known in the prior art, but none provides a very fast, convenient system for retrieving coupons and some are quite cumbersome to transport when not attached. U.S. Pat. No. 4,966,318 to Dutka discloses a shopping organizer which attaches to a shopping cart. The Dutka apparatus is a receptacle for storing coupons, having pleated accordion-like side walls and a plurality of dividers in a fashion similar to portable filing folders for papers. U.S. Pat. No. 4,274,567 to Sawyer and U.S. Pat. No. 4,901,901 to Reitenour also disclose apparatus having a pleated accordion style storage compartment for coupons. Unfortunately, in each of the above disclosures, the coupons are bundled together in general category compartments and thus it may be difficult to access one particular coupon quickly. Also, an apparatus having accordion type side walls must expand horizontally to accommodate coupons and thus may become unwieldy if loaded with a large number of coupons.

U.S. Pat. No. 4,702,402 to Ferri and U.S. Pat. No. 5,002,215 to Gregoire set forth coupon containers securable to a shopping cart and having a hinged lid storage box for coupons. Access speed is limited because, as in the above described cases, all coupons must be grouped in a particular compartment with other coupons having similar characteristics. Further the apparatus capacity is expanded by adding additional box containers, which may tend to make the apparatus difficult to carry to the store.

Modern supermarkets are greatly concerned with traffic flow through the store. Considerable effort has been expended in searching for techniques to "direct traffic" efficiently through the shopping area with efficiency while avoiding congestion in any one area. This is why aisles typically have a mix of high and low traffic items (i.e. items considered staples with items that are not typically bought on every shopping trip). Some stores, such as military exchanges, paint arrows on the floor to route shopper traffic through the store. Thus, a coupon organizer that allows the consumer to load the device according to store layout would aid the store and increase the shopper's efficiency in matching coupons to purchases.

It would be further useful to provide such an apparatus with a calculating device so that the shopper could keep a running tally of costs and compare prices of discounted items to non-discounted items. An apparatus having all the advantages described above without the disadvantages of the prior art would be an advancement of the art.

SUMMARY OF THE INVENTION

Broadly speaking, the invention is a coupon organizing and dispensing apparatus for shoppers to use in a supermarket or similar store environment. The apparatus includes an elongated frame which houses a coupon holder. In one embodiment the coupon holder includes a rotary mechanism to which cards are removably pivoted. The rotary mechanism is made up of a shaft journaled to the frame and having knobs disposed at each end. Circumferential rods spaced apart around the shaft are adapted to removably hold the coupon file cards. The file cards are capable of removably holding store discount coupons in a fixed position. When the shaft is turned by rotating the knobs, the rods serve to sequentially present coupons for the shopper to visually inspect, remove and redeem for a purchased item to be discounted by the coupon's stated amount. Alternatively, the coupon file cards may be pivoted about an arcuate surface which is housed in a similar elongated frame. The coupon apparatus further includes a calculator for the shopper's use and a storage bin to hold coupons selected for redemption. The apparatus has a lower notch adapted to engage a handle of a shopping cart, and the notch is also capable of serving as a carrying handle for when the apparatus is being transported by the shopper.

BRIEF DESCRIPTION OF THE DRAWING

The objects, advantages and features of the present invention will be more clearly understood by reference to the following detailed disclosure when read in conjunction with the accompanying drawing, in which.

DETAILED DESCRIPTION OF THE PREFERRED EMBODIMENTS

Figure 1:
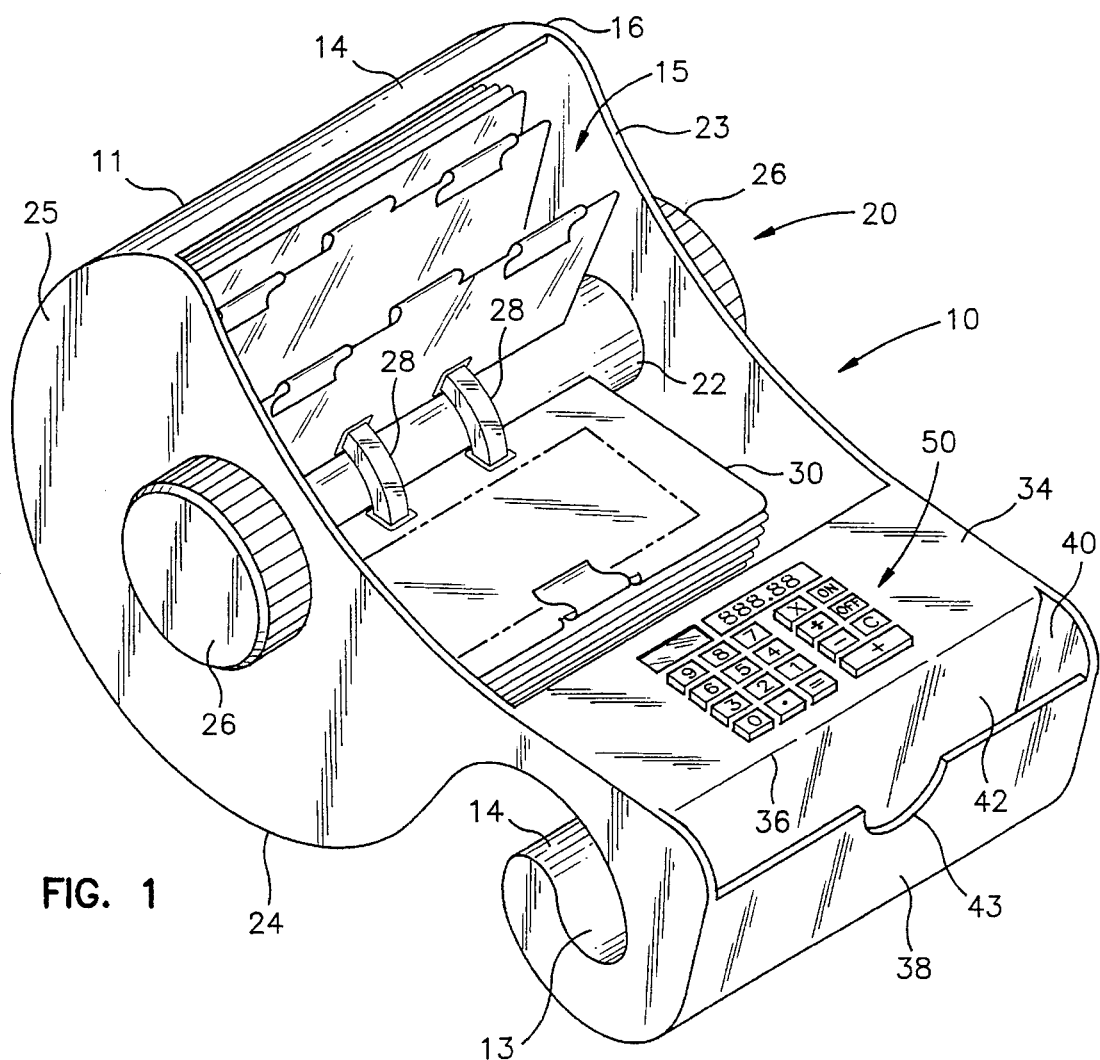
FIG. 1 is a perspective view of a preferred embodiment of the present invention.
Figure 2:
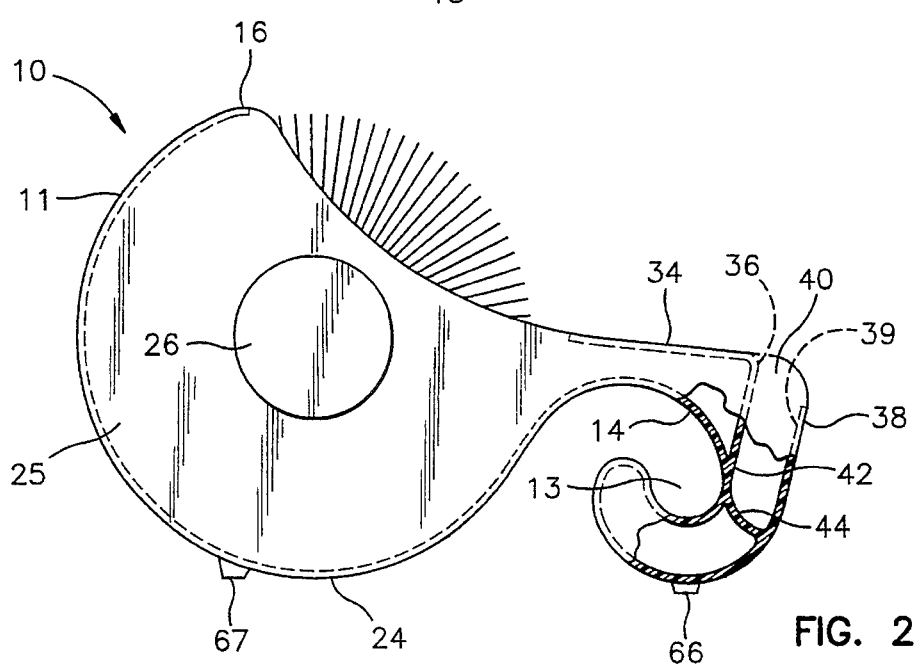
FIG. 2 is a side view of the apparatus of FIG. 1 with a partial cut away portion.

Referring now to FIGS. 1 and 2, rotary store coupon holder and dispensing apparatus 10 includes coupon holder 15 disposed in an elongated frame 11 which has notch 13 at one end adapted to engage the handle of a shopping cart. Notch 13 may also serve as a carrying handle when the apparatus is carried by the user. The frame is composed of spaced parallel sides 23 and 25 having a forward body portion enclosing coupon holder 15, and the notched rearward portion forming part of the handle. A contoured sheet of stiff material 14 preferably extends from top 16, around bottom 24, around and through notch 13, ending in rear external wall 38. Sides 23 and 25 and interconnecting sheet 14 comprise the basic elements of frame 11. It should be noted that sheet 14 may be discontinuous and extend between sides 23 and 25 at spaced locations. Coupon holder 15 incorporates rotary mechanism 20 which includes external knobs 26 and central shaft 22 with spaced rods 28 circumferentially disposed around it. The central shaft may also be referred to as a drum. The shaft is journaled in sides 23 and 25. Rods 28 are adapted to removably slidably engage file cards 30 in a conventional manner. When the shaft is rotated different file cards sequentially come into position to reveal coupons for selection by the user. Preferably, non-slip rubber feet 66 are mounted on the notch end of frame 11 on which the apparatus rests on a flat surface, facilitating sorting and filing of coupons before the shopping trip. Other similar feet 67 are mounted forward of the bottommost portion 24 of the body in a position to prevent the apparatus from rocking forward when knobs 26 are turned.

A convenient feature of the preferred embodiment includes calculator 50 incorporated in or mounted on exterior top face 34. Preferably, the calculator is a solar type which may be molded into place. Solar calculators are well known devices and they serve particularly well in the preferred arrangement because they can be powered by store lighting while mounted at a visible angle.

Another convenient feature of the present invention is a coupon storage bin 40 provided for storing coupons selected for use by the shopper. Referring to FIG. 2, the bin is formed by an inner wall 42 attached integrally to a front edge 36 of exterior top face 34. Wall 42 is disposed substantially perpendicular to the exterior face and has an integral bottom portion 44 curved or sloped toward and attached to interior face 39 of a front wall 38.

Each file card 30 is sized to accommodate a typical retail rebate coupon, for example, 5 ½"×2 ½". Accordingly, the space between side walls 23 and 25 of the frame is slightly wider than the typical coupon. Elongated frame 11 is dimensioned to accommodate coupon file holder 15, calculator 50, and storage bin 40.

Figure 3:
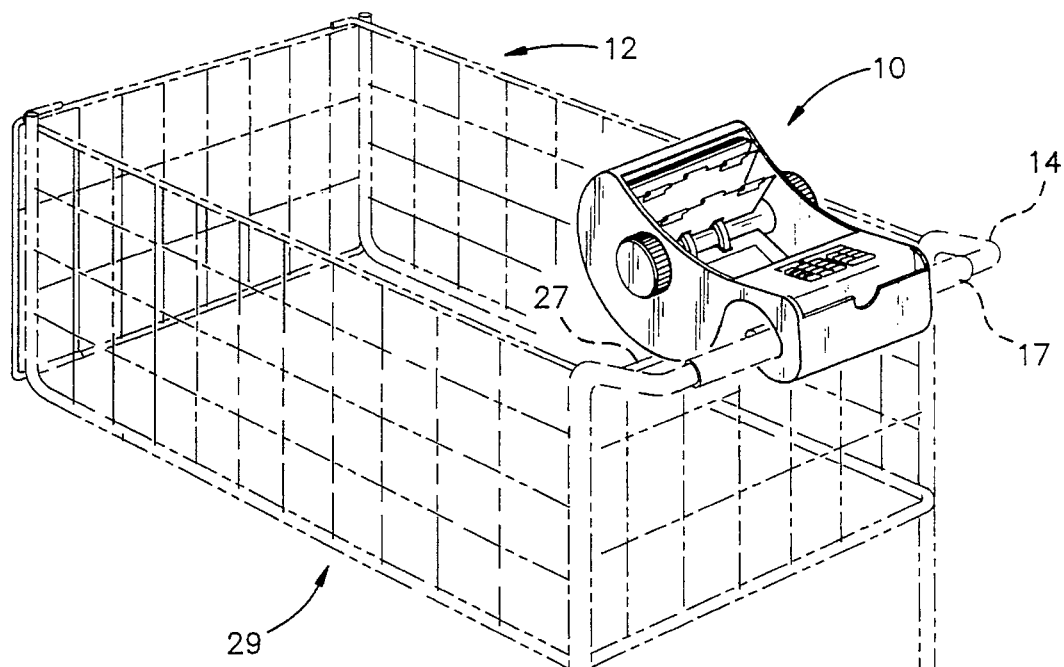
FIG. 3 is a perspective view of the FIG. 1 embodiment in operative engagement on a shopping cart.

FIG. 3 shows rotary coupon file apparatus 10 attached to elongated handle or push bar 14 of typical shopping cart 12. A conventional shopping cart has the following physical characteristics. Handle 14 is typically fabricated from ⅞" diameter tubular steel and often has plastic sleeve 17 wrapped around a portion of the handle. Factoring in the thickness of sleeve 17, the typical handle has a total diameter of between 1" and 1-⅛". The handle is typically about 4" aft of top wire 27 of cart frame 29. The angle from the top of handle 14 to the top of wire 27 is about 30 degrees. Thus, in a preferred embodiment, when the coupon file apparatus is engaged on the handle of the shopping cart, frame 11 will tilt downward toward the front of the cart so that gravity assists in keeping it anchored while the operative portion of the device tilts upwardly toward the user for ready access and enhanced visibility.

Rearwardly disposed notch 13 of the coupon storage apparatus serves a dual purpose. It is employed to engage the file on shopping cart 12 when in use at a store. It is also employed as a carrying handle when the file is being transported by the shopper. The coupon storage and dispensing apparatus is engaged to shopping cart 12 by hooking it over handle 14 and then laying it back until it rests on the top of shopping cart top wire 27. When the apparatus is hooked over the handle and is also resting on the frame of the cart, its center of gravity is rearward of the point where it rests on the cart frame top wire. Thus, it rests on wire 27 at a point closer to notch 13 than is rubber foot 66. The force of gravity therefore exerts sufficient force on notch 13 to securely hold the apparatus in place. In this way, the apparatus frees the hands for other tasks when a user is not accessing a coupon, yet is easy to carry when not engaged to a shopping cart. For further convenience, thumb receiving notch 43 is provided in the top edge of wall 38 for ease of carrying and to facilitate retrieving coupons in bin 40.

Figure 4:
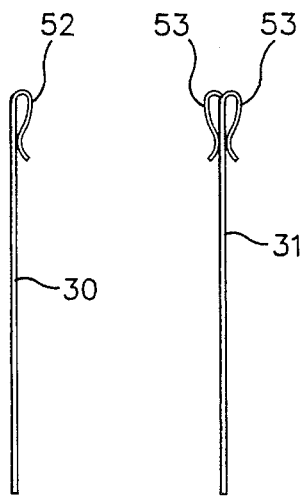
FIG. 4 is a side view of a clamping tab for securing coupons to file cards used in the present invention.
Figure 5:
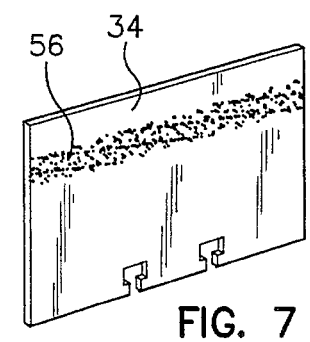
FIG. 5 is a side view of another embodiment of a clamping tab for securing coupons to file cards.
Figure 6:
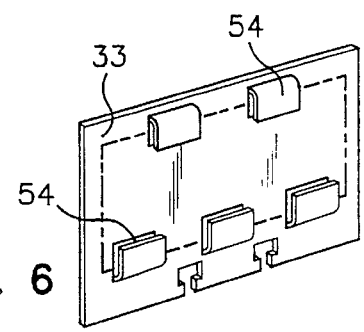
FIG. 6 is a perspective view of a further alternative embodiment of a file card having engaging tabs for securing coupons in a fixed position.

A variety of techniques for securing a coupon to a file card are envisioned. FIG. 4 shows file card 30 having at least one clamping tab 52 for securing one or more coupons in a fixed position on one side of the card. There could be two such tabs at spaced intervals on the card. Referring to FIG. 5, a file card may have one or more clamping tabs 53 on each side of the card which would enable coupons to be removably secured to each side of the file card. In another alternative embodiment as shown in FIG. 6, file card 33 is shown having a plurality of holding tabs 54 disposed in a spaced relationship to support coupons. Tabs 54 are offset from the surface of the file card to enable coupons to be removably secured in a fixed position on the card when the file card is pivoted in the rotary mechanism.

Figure 7:
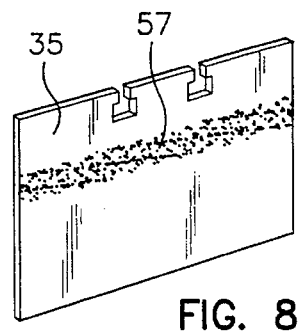
FIG. 7 is perspective view of still another alternative embodiment of a file card useful with the present invention and having a non-permanent adhesive surface area.
Figure 8:
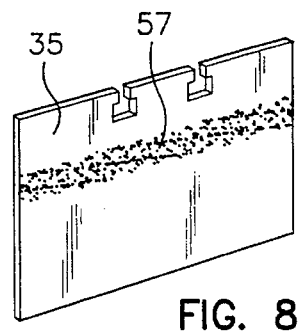
FIG. 8 is a perspective view of yet another alternative file card embodiment similar to FIG. 6.

Still other embodiments are shown in FIGS. 7 and 8, wherein the coupon file cards 34, 35 are provided with areas treated with a non-permanent type adhesive 56, 57 for securing a coupon in a fixed position. The non-permanent adhesive may be that commonly available in office supply stores. For example "Dennison Tack a Note Adhesive Stick" is such an adhesive.

Figure 9:
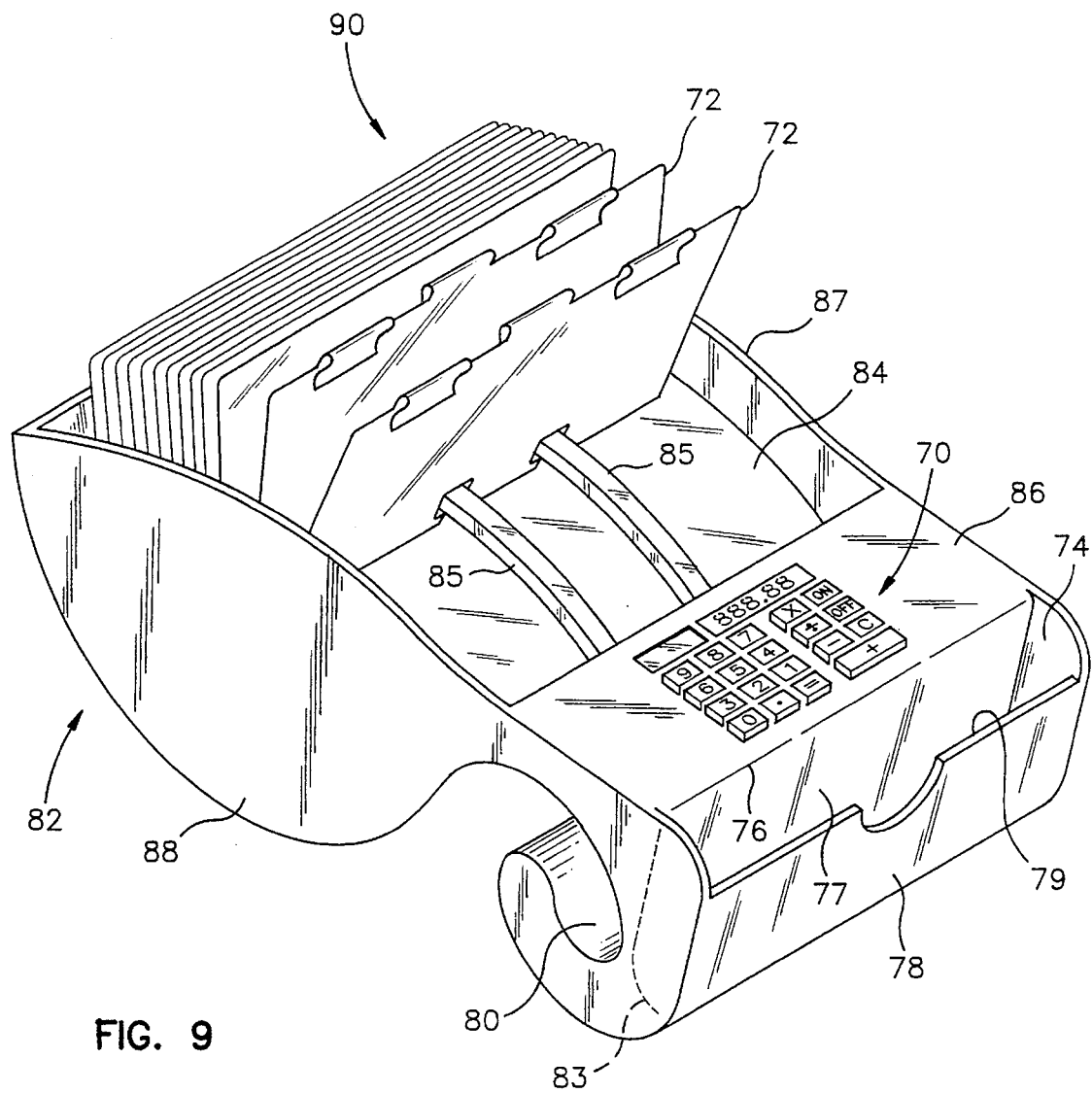
FIG. 9 is a perspective view of an alternative embodiment of the present invention.

Another embodiment of a coupon storage apparatus 90 is shown in FIG. 9. Instead of the rotary hub of the FIGS. 1–3 embodiment, the FIG. 9 structure is formed with arcuate hub 84 which may be termed a "drum". Spaced rods 85 are employed in the same manner as rods 28 in FIG. 1, and are arcuately configured to be parallel with hub 84. File cards 72 are removably and slidably secured to the FIG. 9 apparatus as previously described. The hub is disposed in elongated frame 82 and between opposing side walls 87 and 88. A lower notch 80 serves dual purposes, similar to notch 13 in apparatus 10. The notch is curved to fit a shopping cart handle, such as handle 14 (FIG. 3), and thereby secure apparatus 90 in place on a shopping cart as previously described. The notch also functions as a carrying handle. A calculator 70 may be mounted on or formed in exterior face 86. Coupon storage bin 74 is formed by an inner wall 77 attached integrally to a rearward edge 76 of exterior face 86. The inner wall is disposed substantially perpendicular to the exterior face and has an integral bottom portion 83 bent toward and attached to an interior face 79 of a outer wall 78.

The apparatus of this invention is flexible in that it permits each user his own preferred method for arranging the coupons since the arrangement may be changed simply by repositioning file cards which are removably secured to the spaced rods. One envisioned method of using the apparatus is for the user to arrange the coupons according to food/merchandise categories (e.g. soups, frozen foods, etc.) and then to load the apparatus according to the store layout. In this manner the coupon storage apparatus may be used to maximize the efficiency of the shopper and to increase shopper traffic speed. Category or alphabetical index cards may be employed to separate groupings of coupons.

Some additional features of the present invention are envisioned. It is imagined that supermarkets, to reduce shopper congestion, will provide directory cards pre-adapted (i.e., punched with holes and sized accordingly) to fit the coupon storage apparatus. Product manufacturers may also provide such pre-adapted coupons to shoppers. Stores may provide a coupon apparatus of the type disclosed herein for customers to use while shopping. Such a store provided apparatus may be pre-loaded with the store' s directory card. Thus, shoppers may carry pre-adapted coupons to the store, as well as normal coupons placed in file cards, such as file card 30, to be placed directly into an apparatus provided by the store.

Accordingly, a store coupon storage and dispensing apparatus has been described. While various embodiments have been disclosed, it should be apparent that many variations and alternative embodiments would be apparent to those skilled in the art in view of the teachings herein. It is understood, therefore, that the invention is not to be in any way limited except in accordance with the spirit and scope of the appended claims and their equivalents.

What is claimed is:

1. A store coupon storage and dispensing apparatus comprising:

an elongated frame comprising opposing spaced side walls interconnected by a contoured sheet of stiff material, a downwardly opening notch being formed in one end of said frame and being shaped and configured to engage a handle of a shopping cart;

a drum providing a curved path for coupon file cards, said drum being disposed in said frame extending between said side walls; and means for removably, engageably retaining coupon file cards on said drum and adapted to permit the file cards to be slidable along said curved path.

2. The store coupon apparatus according to claim 1, and further comprising a calculator mounted on said frame.

3. The store coupon apparatus according to claim 1, and further comprising a storage cavity disposed in said frame for storing coupons which have been selected by a user.

4. The store coupon apparatus according to claim 1, and further comprising at least one file card, each said file card having at least one clamping tab for removably securing a coupon in a fixed position on said file card.

5. The store coupon apparatus according to claim 1, and further comprising at least one file card, each said file card having a plurality of holding tabs disposed in a spaced relationship to support a coupon on said file card, said tabs further having a bent portion to secure said coupon in a fixed position when said file card is pivoted.

6. The store coupon apparatus according to claim 1, wherein each said file card is provided with a non-permanent type adhesive for removably securing a coupon in a fixed position on said file card.

7. The store coupon apparatus according to claim 1, wherein said retaining means includes at least one rod arcuately disposed around said drum, each said rod being engageable by said coupon file cards.

8. The store coupon apparatus according to claim 1, wherein said drum is rotatably journaled to said side walls, said apparatus further comprising means for selectively rotating said drum with respect to said frame.

9. The store coupon apparatus according to claim 8, wherein said means for rotating further comprises first and second rotary knobs, each said knob attached at opposite ends of said drum.

10. The store coupon apparatus recited in claim 1, wherein said drum is arcuate in shape and is fixed with respect to said frame.

11. A store coupon storage and dispensing apparatus comprising:

an elongated frame comprising opposing spaced side walls interconnected by a contoured sheet of stiff material, a downwardly opening notch being formed in one end of said frame and being shaped and configured to engage a handle of a shopping cart;

an arcuate hub providing a curved path for at least one coupon file card, said arcuate hub being disposed in said frame extending between said side walls; and means for removably, slidably retaining said at least one coupon file card about said hub.

12. The store coupon apparatus according to claim 11, and further comprising a calculator mounted on said frame.

13. The store coupon apparatus according to claim 11, and further comprising a storage cavity disposed in said frame for storing coupons which have been selected by a user.

14. The store coupon apparatus according to claim 11, and further comprising at least one file card, each said file card having at least one clamping tab for removably securing a coupon in a fixed position on said file card.

15. The store coupon apparatus according to claim 11, and further comprising at least one file card, each said file card having a plurality of holding tabs disposed in a spaced relationship to support a coupon on said file card, said tabs further having a bent portion to secure said coupon in a fixed position when said file card is pivoted.

16. The store coupon apparatus according to claim 11, and further comprising at least one file card, each said file card being provided with a non-permanent type adhesive for removably securing a coupon in a fixed position on said file card.

17. A store coupon storage and dispensing apparatus comprising:

an elongated frame comprising opposing spaced side walls interconnected by a contoured sheet of stiff material, a downwardly opening notch being formed in one end of said frame and being shaped and configured to engage a handle of a shopping cart;

coupon file card positioning means providing a curved path for coupon file cards, said coupon file card positioning means being disposed in said frame extending between said side walls; and means for removably retaining coupon file cards on said coupon file card positioning means and adapted to permit coupon file cards to be slidable along said curved path.

18. The apparatus according to claim 17, and further comprising:

at least one coupon file card; and means on said coupon file card for removably retaining at least one store coupon.

19. The store coupon apparatus according to claim 17 and further comprising a calculator mounted on said frame.

20. The store coupon apparatus according to claim 17, and further comprising a storage cavity disposed in said frame for storing coupons which have been selected by a user.

21. The store coupon apparatus according to claim 17, and further comprising at least one file card, each said file card having at least one clamping tab for removably securing a coupon in a fixed position on said file card.

22. The store coupon apparatus according to claim 17, and further comprising at least one file card, each said file card having a plurality of holding tabs disposed in a spaced relationship to support a coupon on said file card, said tabs further having a bent portion to secure said coupon in a fixed position when said file card is pivoted.

23. The store coupon apparatus according to claim 17, wherein each said file card is provided with a non-permanent type adhesive for removably securing a coupon in a fixed position on said file card.

24. The store coupon apparatus according to claim 17, wherein said retaining means includes at least one rod arcuately disposed around said coupon file card positioning means, each said rod being engageable by said coupon file cards.

25. The store coupon apparatus according to claim 17, wherein said coupon file card positioning means is rotatably journaled to said side walls, said apparatus further comprising means for selectively rotating said coupon file card positioning means with respect to said frame.

26. The store coupon apparatus according to claim 25, wherein said means for selectively rotating further comprises first and second rotary knobs, each said knob attached at opposite ends of said shaft.

27. The store coupon apparatus recited in claim 17, wherein said drum is arcuate in shape and is fixed with respect to said frame.

* * * * *